United States Patent Office 3,440,205
Patented Apr. 22, 1969

3,440,205
ROOM TEMPERATURE CURING ORGANOPOLY-
SILOXANE ELASTOMERS
Rajendra Nath Chadha, Ann Arbor, and Kailash Chandra Pande, Adrian, Mich., and Richard Eugene Ridenour, Sylvania, Ohio, assignors to Stauffer Chemical Company, New York, N.Y., a corporation of Delaware
No Drawing. Filed Nov. 2, 1965, Ser. No. 506,125
Int. Cl. C08g 51/10, 51/04
U.S. Cl. 260—37
8 Claims

ABSTRACT OF THE DISCLOSURE (Cyclo-triacyloxy tetrasiloxy -) end blocked siloxanes and their use as RTV gums are disclosed.

This invention relates to preparations of essentially paste-like consistency which upon exposure to atmospheric moisture at normal temperatures become converted to a solid elastic state.

Such preparations are referred to in the art as room temperature vulcanizing (RTV) compositions and find utility, for example, in mold making, in coating operations and in the construction industry for caulking. They are commonly laid down as from a pot or a specially designed tube.

Preparations of the type herein fall into two categories. In the one case, the commercial package comprises two containers, one for the base composition, the other containing a catalyst which must be admixed with the base material to induce proper curing of the latter. Preparations of the second category do not require a catalyst, which is to say that they are self-curing.

Compositions conforming to the present invention fit into the last described category and are distinguished in that they comprise as the moisture activated component an organopolysiloxane material according with the formula (a) 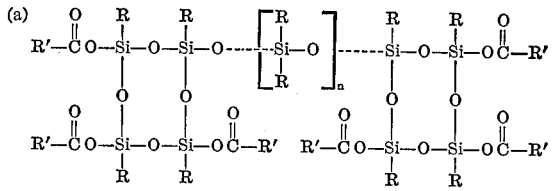

in which $n$ is an integer sufficient to yield a viscosity of from about 500 to about 500,000 centipoises, R is a monovalent hydrocarbon radical, preferably methyl, a halogenated monovalent hydrocarbon radical or a cyanoalkyl radical, and R' is H or an alkyl or halo-alkyl radical of not more than four carbon atoms.

In the practice of the invention, the acyloxy-substituted organopolysiloxane is generally prepared by reacting an hydroxy end-blocked organopolysiloxane fluid with a 2,4,6,8-tetraacyloxycyclotetrasiloxane:

(b) 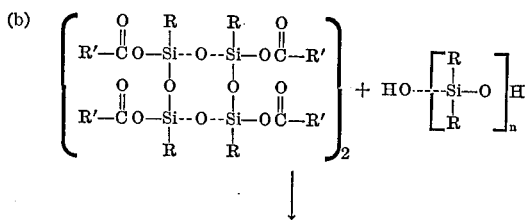

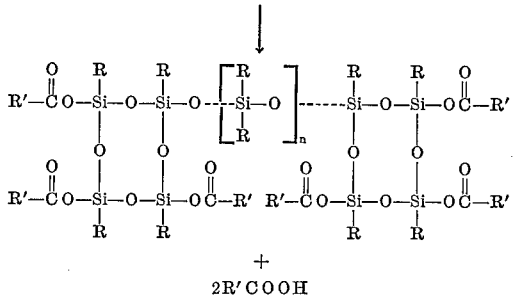

+ 2R'COOH

In this equation R and R' have the same significance as in the formula first appearing herein and $n$ is an integer of a value as demanded to achieve the viscosity requirement above indicated.

The tetraacyloxycyclotetrasiloxane may be derived as by reaction of the corresponding hydrogen-bearing cyclotetrasiloxane with the mercuric acylate containing the desired R' group:

(c) 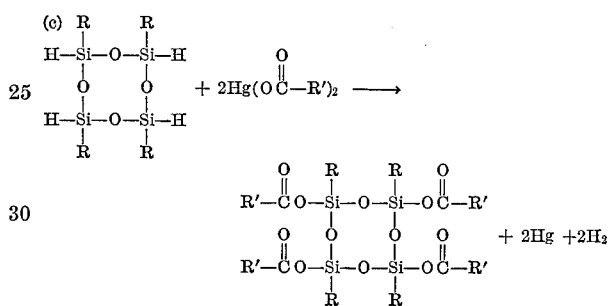

Reaction (c) is generally carried out using stoichiometrical proportions of the reactants. As a matter of convenience, the mercuric acylate may be applied dissolved or slurried in a suitable organic solvent, where possible the mono-hydric alcohol or mono-basic acid containing R'. The reaction, which is exothermic, is carried out with constant stirring under a blanket of inert gas, normally nitrogen.

As indicated by equation (b) the reaction involving the hydroxy end-blocked organopolysiloxane fluid and the acylated cyclotetrasiloxane demands by theory the use of at least 2 moles of the latter, but as a matter of practice it has been found that in some cases acceptable results can be achieved using as little as 1.6 moles of the acylated cyclotetrasiloxane per mole of hydroxy end-blocked fluid. In general, however, it is preferable to use the tetrasiloxane in excess, i.e. 2.5 to 4 moles per mole of hydroxy fluid, 2.5 moles being preferred. This reaction, like the reaction immediately above, is best carried out in the presence of a solvent, heptane for example, and with constant stirring. An inert gas atmosphere e.g. nitrogen, is desirable to prevent premature moisture-activation of the reaction product with the consequent complications. Alternatively, an atmosphere of desiccated air can be used.

Alternative methods for preparing the acylated cyclotetrasiloxane are available. Thus, in lieu of the above described method, one may react the hydrogen-bearing cyclotetrasiloxane with acetic acid in the presence of a suitable catalyst. Here again one or more solvents are normally employed and a nitrogen blanket used.

On the basis of the results of a large number of experiments, an hydroxy end-blocked fluid in which the organo substituents are methyl groups is preferred in the practice of the invention. As to the acyloxy substituents in the product material, acetoxy or propionoxy is preferred. The nature of the acyloxy groups is largely a matter of the extent of the cure period desired or specified. Where a fairly fast cure is required, as is generally true, we employ acetoxy groups. As suggested, it has been found that as a rule the higher the molecular weight of the acyloxy group, the slower the cure. It has further been determined that branched chain groups tend toward a slower cure than their linear counterparts. Thus, by deriving the acyloxy groups from n-butyric acid a faster cure is achieved than when such groups are derived from iso- or t-butyric acid.

As indicated by the viscosity range previously recited, the extent to which the hydroxy end-blocked organopolysiloxane material is polymerized varies widely. Thus $n$ in the type formula may have a value of as low as 5 (corresponding to a very thin fluid) or as high as 9,000 or more as obtains in the instance of extremely slow-flowing gums. Usually and preferably, the viscosity of the fluid lies within the range 1,500 to 100,000 centipoises. Mixtures of high and low viscosity hydroxy end-blocked fluids are of course applicable to the invention. Moreover, it should be understood that the hydroxy end-blocked fluid employed may represent either a homopolymer of similar siloxane units or a copolymer of dissimilar units.

In some instances, it may be desirable to modify compositions conforming to the invention in order to achieve special properties. For example, to improve adhesiveness there may be incorporated in the composition a suitable amount of a resinous siloxane. In addition, these resinous siloxanes may be used to decrease the elasticity of the cured composition, which in some cases is a desideratum. Plasticization of the vulcanized compositions, where necessary or desirable, can be achieved using various materials, including trimethyl end-blocked dimethyl siloxanes.

Although the compositions herein can often be applied per se with good effect, they are of greatest commercial interest at present as applied in admixture with various fillers. These may be reinforcing or non-reinforcing, fibrous or non-fibrous. In general, substantially any of the fillers employed in the compounding of silicone rubbers may be used in the practice of the invention. As exemplary of reinforcing fillers may be mentioned: fumed silicas, high-surface area precipitated silicas, silica aerogels and the like. The coarser silicas, as diatomaceous earths and crushed quartz, are examples of non-reinforcing filler materials having application to the invention. In this connection, metallic oxides as titanium oxide, ferric oxide, zinc oxide, etc., also should be noted. Applicable fibrous fillers include asbestos and fibrous glass.

Considering the effect of moisture on the compositions herein, it is manifestly important that the filler material be dry before use for the purposes of the invention. The quantity of filler employed depends on the nature of the particular filler and the properties desired in the final product. In most cases where a filler is used, the same is applied in an amount representing about 40 to about 80 parts by weight, most frequently 50–70 parts by weight, per 100 parts of the organopolysiloxane material.

Where the composition is to be used in caulking, care should be exercised to select a filler which will preclude any tendency of the composition to slump during application or thereafter. The term "slump," of course, refers to gravity-induced flow of such a material with resultant development of areas of non-uniform section.

Apart from fillers as before mentioned, compositions conforming to the invention may contain coloring agents, agents capable of preventing the passage of ultraviolet light, desiccants and antioxidants, for instance. Also, depending upon the use to which the composition is to be put, it may or may not be desirable or necessary to include a dielectric material, graphite for example.

As hereinbefore suggested, compositions conforming to the invention can be tailored to fit various specifications as to cure times. In caulking, for instance, the working time from the pot is more or less conventionally calculated as of the order of 2–2½ hours. Thus to meet this requirement, the starting materials used in the preparation of the composition are so selected that substantial stiffening of the composition will not occur until after expiration of such period of time. Normally, the applied material is tack-free within ½ to 3 hours, is substantially cured after 24 hours and completely cured after 7 days. These periods of course, vary somewhat as to any given composition with changes in humidity and also with changes in temperature. In general, the higher the temperature and humidity the faster the cure.

The compositions herein, assuming proper packaging, show an excellent shelf-life, which is to say that they can be stored for prolonged periods of time without adverse effect.

Normally, the moisture activation of the composition as it is laid down occurs through the influence of the moisture in the ambient air at the work site, but extraneous water vapor may be supplied by any suitable means to hasten the cure where and when desirable. It would appear that the curing process proceeds with cross-linking of the organopolysiloxane polymer units as illustrated below:

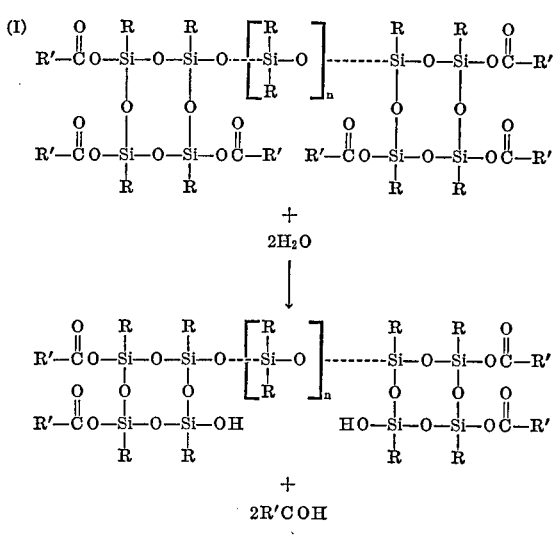

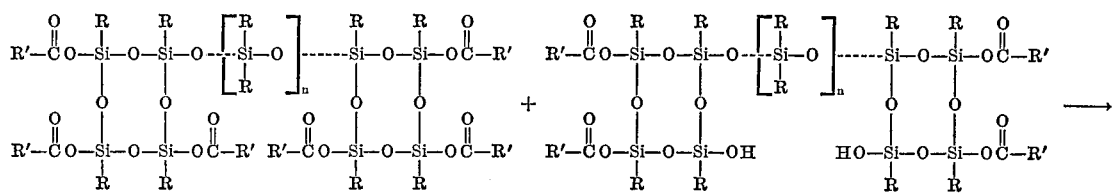

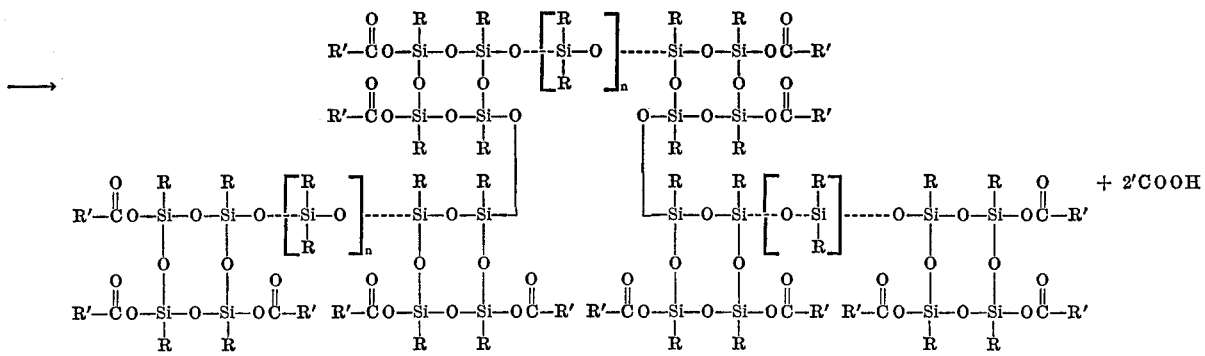

The cross-linked structure is, of course, subject to further cross-linking through hydrolysis of one or more of its acyloxy groups.

The invention is further illustrated by the following examples which are not to be taken as in anyway limitative thereof:

EXAMPLE I

To a three neck 250 ml. round bottom flask, fitted with stirrer, condenser, dropping funnel and nitrogen inlet was added 63.6 gm. (0.2 mole) of mercuric acetate slurred in 200 ml. of anhydrous methanol. Into this mixture was introduced, dropwise over a one hour period, 6.8 gm. (0.028 mole) 2,4,6,8-tetramethylcyclotetrasiloxane. The reaction was exothermic.

After refluxing for 24 hours, the methanol was distilled off and the product was extracted from the excess mercuric acetate and mercury metal with pentane, whereafter it was stripped in vacuo.

Infrared analysis showed no residual Si-H bonds, and a large

bond at 1720 cm.$^{-1}$, conforming to 2,4,6,8-tetramethyl-tetraacetoxycyclotetrasiloxane.

The product cured to a solid on exposure to air and gave off a strong acetic acid odor.

EXAMPLE II

The procedure followed in Example I was repeated, with the exception that the ratio of mercuric acetate to the tetramethylcyclotetrasiloxane was stoichiometrically correct (1:2). Also, acetic acid was employed as solvent in lieu of methanol. This method simplified the preparation considerably, yet gave the same results.

EXAMPLE III

The acylated product of Example II (25.5 gm. 0.054 mole) was dissolved in 100 ml. of heptane and added to 220 gm. of hydroxy end-blocked dimethyl polysiloxane fluid (2800 cs., 8800 gm./mole). This mixture was refluxed for three hours whereafter the heptane was stripped off in vacuo.

The product cured to a tack-free rubber in 2 hours and showed excellent shelf-life.

EXAMPLE IV

In a three neck 250 ml. flask fitted with dropping funnel, nitrogen inlet, reflux condenser and stirrer was placed 9.7 ml. of 2,4,6,8-tetramethylcyclotetrasiloxane in 50 ml. of acetic acid and 100 ml. of tetrahydrofuran.

After refluxing for 0.5 hour, no noticeable reaction had taken place, so 10 microliters of a solution of H$_2$PtCl$_6$ in isopropanol was added.

Evolution of hydrogen began immediately and proceeded smoothly for 2 hours, following which the tetrahydrofuran, isopropanol and excess acetic acid were distilled off.

The resultant material showed a large (upwards of 80%) decrease in SiH bond and a corresponding

bond at 1720 cm.$^{-1}$, demonstrating the presence of the desired 2,4,6,8-tetramethyltetraacetoxycyclotetrasiloxane. The acylated product cured similarly to the product of Example I.

EXAMPLE V

To 30 gm. of uncured polymer of Example III was added 15 gm. of five-micron silica filler (Minusil).

This composition was then exposed to the atmosphere, and showed a tack-free surface in 3 hours.

After 24 hours a completely cured elastomer resulted.

EXAMPLE VI

To 2.5 gm. of tetramethyltetraacetoxycyclotetrasiloxane prepared according to Example II was added 22.1 gm. of an hydroxylated fluid having an approximate molecular weight of 8800, the fluid being filled with 75 parts of acicular iron oxide per 100 parts of the fluid.

To this mixture was added about 50 ml. of anhydrous heptane, whereafter the reaction mixture was stirred and refluxed under a nitrogen blanket for one hour.

Following the refluxing, heptane and acetic acid were stripped off in vacuo and the composition exposed to the atmosphere.

After 2 hours the composition was tack-free and after 24 hours the same had cured to a rubbery solid.

EXAMPLE VII

Forty-six gm. (0.147 mole) of mercuric acetate was dissolved in 100 ml. of acetic acid. To this solution was added 17.6 gm. (0.0735 mole) of 2,4,6,8-tetramethyl-cyclotetrasiloxane.

The reaction mixture was refluxed for 1 hour, whereafter the solution was decanted from the resulting metallic mercury. Thirty ml. Aliquots of the solution, each containing 4.5 gm. (0.01 mole) of tetramethyltetraacetoxycyclotetrasiloxane, were added to various proportions of an hydroxylated fluid having a molecular weight 8800 and filled with 75 parts of acicular iron oxide per 100 parts of fluid. All samples were thereafter refluxed in 50 ml. of anhydrous heptane for 1 hour, stripped in vacuo and then poured out to air cure.

The results are summarized in the following table:

| Reaction time | Wgt. of fluid and filler (gm.) | Molar ratio of acetoxy material to OH fluid | Tack-free time |
|---|---|---|---|
| 1 | 129 | 0.01/0.012 | No cure. |
| 2 | 65 | 0.01/0.006 | Do. |
| 3 | 43 | 0.01/0.004 | 72 hours. |
| 4 | 21 | 0.01/0.0025 | 3 hours. |

The invention claimed is:
1. An organopolysiloxane according to the formula

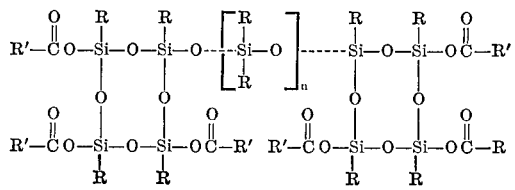

in which $n$ is an integer sufficient to yield a viscosity of from about 500 to about 500,000 centipoises, R is selected from the class consisting of monovalent hydrocarbon, halo-hydrocarbon and cyano-alkly radicals and R' is H or an alkly or halo-alkyl radical of not more than 4 carbon atoms.

2. An organopolysiloxane comforming to the formula

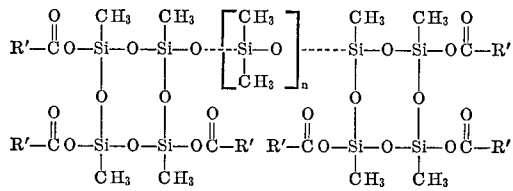

in which $n$ has a value between 5 and about 9,000 and R' is H or an alkly or halo-alkly radical of not more than 4 carbon atoms.

3. A composition comprising an organopolysiloxane in accordance with claim 1 and incorporating a filler material.

4. A composition comprising an organopolysiloxane in accordance with claim 2 and incorporating about 40 to about 80 parts by weight of a filler material per 100 parts of the organopolysiloxane.

5. A composition comprising an organopolysiloxane in accordance with claim 2 and incorporating about 50 to about 70 parts by weight of a filler per 100 parts of the organopolysiloxane.

6. An organopolysiloxane in accordance with claim 1 where $n$ has a value providing a viscosity between 1,500 and 100,000 centipoises.

7. An organopolysiloxane conforming to claim 2 in which $n$ has a value between 5 and about 9,000 and R' is methyl.

8. A composition comprising an organopolysiloxane in accordance with claim 7 and incorporating from about 40 to about 80 parts by weight of filler material per 100 parts of the organopolysiloxane.

References Cited
UNITED STATES PATENTS

| | | | |
|---|---|---|---|
| 2,566,347 | 9/1951 | MacKenzie | 260—448.8 |
| 2,658,908 | 11/1953 | Nitzsche et al. | 260—46.5 |
| 3,035,016 | 5/1962 | Bruner | 260—307 |
| 3,189,576 | 6/1965 | Sweet | 260—448.2 |

MORRIS LIEBMAN, *Primary Examiner.*

J. E. CALLAGHAN, *Assistant Examiner.*

U.S. Cl. X.R.

260—46.5, 448.5

UNITED STATES PATENT OFFICE
CERTIFICATE OF CORRECTION

Patent No. 3,440,205                                              April 22, 1969

Rajendra Nath Chadha et al.

It is certified that error appears in the above identified patent and that said Letters Patent are hereby corrected as shown below:

Column 4, about line 62, "2R'COH" should read -- 2R'COOH --. Columns 5 and 6, right-hand side of the formula, that portion reading

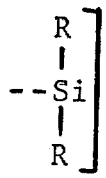      should read      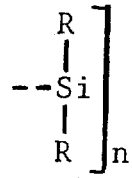

same formula, right-hand side of the formula, that portion reading "+2'COOH" should read --+2R'COOH --. Column 7, first formula, right-hand side of the formula reading

      should read      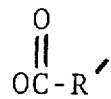

Signed and sealed this 14th day of April 1970.

(SEAL)
Attest:

EDWARD M. FLETCHER, JR.                      WILLIAM E. SCHUYLER, JR.
Attesting Officer                                       Commissioner of Patents